United States Patent [19]

Feeney et al.

[11] Patent Number: 5,535,416
[45] Date of Patent: Jul. 9, 1996

[54] METHOD FOR ALLOWING APPLICATION PROGRAM IN COMPUTER SYSTEM TO ACCESS DEVICE DIRECTLY IN EXCLUSIVE MODE BY BYPASSING OPERATING SYSTEM AND BLOCKING REQUESTS FROM OTHER PROGRAMS

[75] Inventors: James W. Feeney, Endicott; George W. Wilhelm, Jr., Endwell, both of N.Y.

[73] Assignee: International Business Machines Corp., Armonk, N.Y.

[21] Appl. No.: 459,014

[22] Filed: Jun. 1, 1995

Related U.S. Application Data

[63] Continuation of Ser. No. 17,197, Feb. 12, 1993, abandoned.

[51] Int. Cl.$^6$ ................................................ G06F 15/40
[52] U.S. Cl. .................... 395/834; 395/500; 364/280; 364/281.7; 364/282.2; 364/DIG. 1
[58] Field of Search ................................. 395/500, 700, 395/821, 822, 823, 824, 825, 834

[56] References Cited

U.S. PATENT DOCUMENTS

| | | | |
|---|---|---|---|
| 5,029,077 | 7/1991 | Fatahalian et al. | 364/280 |
| 5,060,149 | 10/1991 | Flurry et al. | 364/200 |
| 5,083,262 | 1/1992 | Haff, Jr. | 395/500 |
| 5,109,510 | 4/1992 | Baker et al. | 395/650 |
| 5,179,666 | 1/1993 | Rimmer et al. | 395/275 |
| 5,220,653 | 6/1993 | Miro | 395/275 |
| 5,226,141 | 7/1993 | Esbensen | 395/425 |
| 5,245,702 | 9/1993 | McIntyre et al. | 395/157 |
| 5,265,252 | 11/1993 | Rawson, III et al. | 395/700 |
| 5,301,277 | 4/1994 | Kanai | 395/275 |
| 5,307,491 | 4/1994 | Feriozi et al. | 395/700 |
| 5,319,751 | 6/1994 | Garney | 395/275 |
| 5,339,432 | 8/1994 | Crick | 395/700 |

FOREIGN PATENT DOCUMENTS

| | | |
|---|---|---|
| 442728A2 | 8/1991 | European Pat. Off. . |
| 487290A2 | 5/1992 | European Pat. Off. . |

OTHER PUBLICATIONS

IBM Systems Journal, 1988, USA, vol. 27, No. 2, ISSN 0018–8670, pp. 134–157, Cook R. L. et al, "Writing an Operating System/2 Application".

BYTE, 1988, USA, vol. 13, No. 11, ISSN 0360–5280, pp. 177–184, McLain M. M. et al, "writing OS/2 Graphics Programs".

*Primary Examiner*—Thomas C. Lee
*Assistant Examiner*—Moustafa Mohamed Meky
*Attorney, Agent, or Firm*—Eugene I. Shkurko; Shelley M. Beckstrand

[57] ABSTRACT

A data processing system gives an application running on the operating system exclusive ownership of a hardware device. The system is operable in two modes. In the first mode the application interacts with the hardware device by making use of the processing system. In this mode many layers of the processing system are involved and the interaction time with the hardware is slow and inconsistent. In the second mode, exclusive ownership of the hardware device is granted to the application by the driver. In this mode the application has direct access to the hardware device thus avoiding the involvement of the processing system layers. The application accesses and uses the driver through a low latency processor interface linked into the application program itself.

8 Claims, 5 Drawing Sheets

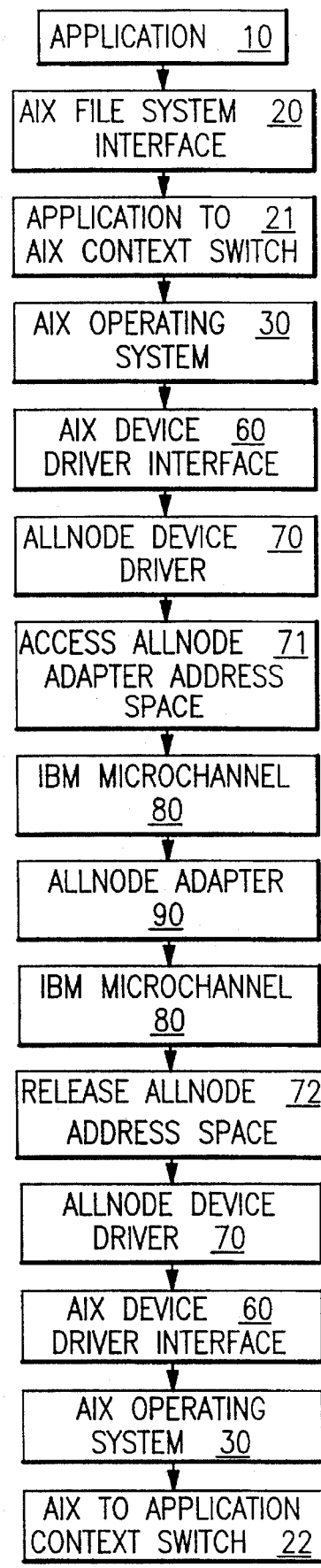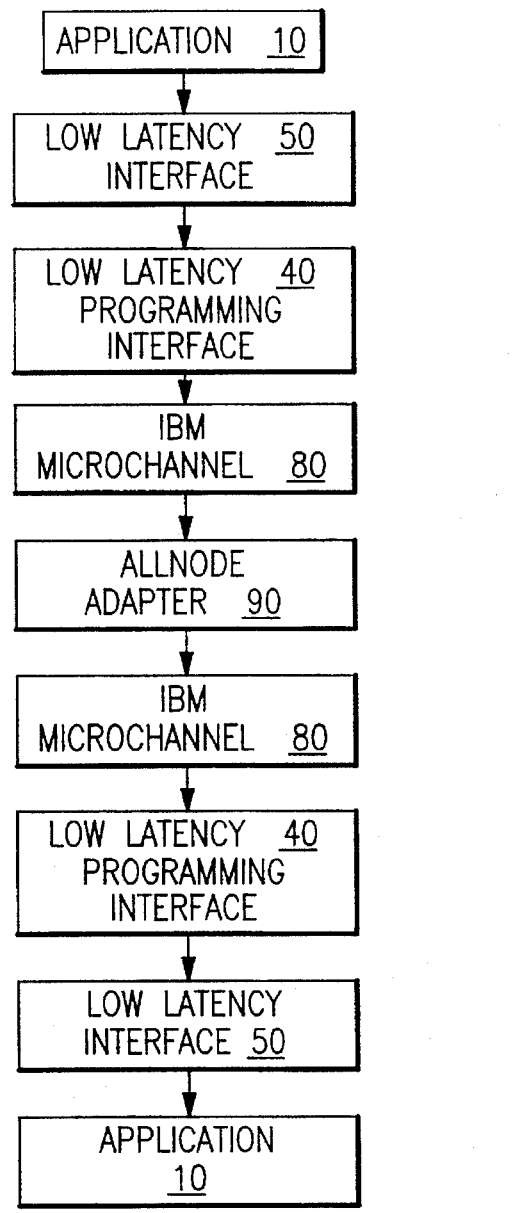
FIG.2
FIG.3

201 IF ALLNODE CHANNEL NUMBER N IS OPEN
202 THEN
203   IF ALLNODE CHANNEL NUMBER N=1
204   THEN
205     RELEASE ALLNODE ADAPTER ADDRESSES
206   END
207   SET ALLNODE CHANNEL N TO CLOSED
208   SET SUCCEEDED (RC=0)
209 ELSE
210   SET ERRNO=ALLNODE CHANNEL NOT OPEN
211   SET FAILED (RC=-1)
212 END
213 RETURN (RC)

```
101 PREVENT INTERRUPTS AND APPLICATION SWAPPING
102 IF ALLNODE CHANNEL NUMBER N=1
103 THEN
104   IF NO ALLNODE CHANNELS ARE OPEN
105   THEN
106     SET ALLNODE CHANNEL 1 TO OPEN
107     ASSIGN ALLNODE ADAPTER ADDRESSES TO APPLICATION
108     SET SUCCEEDED (RC=0)
109   ELSE
110     SET ERRNO=ALLNODE ADAPTER BUSY
111     SET FAILED (RC=-1)
112   END
113 ELSE     SIXTH LEVEL /*COMMENT*/
114   IF ALLNODE CHANNEL 1 IS NOT OPEN
115   THEN
116     IF ALLNODE CHANNEL N IS NOT OPEN
117     THEN
118       SET ALLNODE CHANNEL N TO OPEN
119       SET SUCCEEDED (RC=0)
120     ELSE
121       SET ERRNO=ALLNODE CHANNEL IN USE
122       SET FAILED (RC=-1)
123     END
124   ELSE
125     SET ERRNO=ALLNODE ADAPTER IN USE BY LLPI
126     SET FAILED (RC=-1)
127   END
128 END
129 ALLOW INTERRUPTS AND APPLICATION SWAPPING
130 RETURN (RC)
```

FIG.6

METHOD FOR ALLOWING APPLICATION PROGRAM IN COMPUTER SYSTEM TO ACCESS DEVICE DIRECTLY IN EXCLUSIVE MODE BY BYPASSING OPERATING SYSTEM AND BLOCKING REQUESTS FROM OTHER PROGRAMS

This application is a continuation of application Ser. No. 08/017,197, filed Feb. 12, 1993, now abandoned.

BACKGROUND OF THE INVENTION

1. Technical Field

This invention relates to data processing systems, and in particular to the ability of an application program to access hardware devices in a fast and consistent manner.

2. Description of the Prior Art

Typical data processing systems (systems) support multiple application programs (applications) running at the same time. To accomplish this the processing systems have multiple layers that isolate the actual hardware from the applications. In a typical processing system one of the layers is the device driver which directly accesses the hardware device. The next layer is an operating system, such as AIX. This layer controls which application can access the device driver next. When an application interacts with a hardware device, the interactions must pass through these layers of the processing system. Each layer adds processing time and may even block usage of the hardware device to allow another application to use it.

Some systems allow all applications to access the hardware device directly whenever required. This is the way processing systems used to operate. However, the applications could only run one at a time. Typically, one application would run then when it completed, the next application would run. As systems became faster the execution of programs often had to wait for a hardware device to complete its operation before continuing. In order to improve the utilization of the entire system, multiple applications were run at the same time. This resulted in multiple applications trying to use the same hardware device, perhaps in different ways, at the same time. This led to the need to coordinate the hardware device usage between the applications and to protect themselves from each other. The coordination and programming effort became so large that this approach has been abandoned for general purpose processing systems that support multiple applications. It is still in use in special purpose processing systems that perform dedicated tasks such as control processors in automobiles or aircraft.

The problem of coordinating and protecting multiple applications led to contemporary general purpose systems. In these systems the hardware resources are owned by the system, and all interactions with the hardware devices go through the system. The system typically has multiple layers such as device drivers to directly access and control the hardware and an operating system to control the application access to the device drivers. The requirement to interact with a hardware device through these layers results in degraded performance for a single application using the hardware device.

In order to reduce this performance degradation, some systems grant an application restricted access to a hardware device. Access is restricted, in that the system remains involved in some portion of the hardware device operation so that it knows when another application needs the hardware. The system then requests that the application give up direct access to the hardware device. If the application does not give up access in a reasonable time, the system removes the hardware device from the application control and terminates the application.

Typical of this mode of operation is the use of virtual displays and input devices connected to a system. Each application thinks it has its own display and input device when in fact they are all sharing the same display and input devices. In normal text mode of keyboard operation and display, the extra processing time added by the system layers are not noticeable. However, when a pointing device such as a mouse and a graphical display are used, the extra overhead is noticed as a lag between moving the pointing device and movement on the display. To correct this, the application is given direct output access to the display so that it can be updated as quickly as possible. Access to the input devices is retained by the system. Therefore this portion of the operation is still degraded. This is done so that a user can request to switch the display from one application to the next. The system recognizes the user signal and transfers direct access to the display from one application to the other. This method of operation is acceptable for virtual displays because human hand movements are much slower than sight. However, for applications such as network communications, both the input and output devices must perform as quickly as possible. For application-to-application interactions through hardware, especially in the parallel processing environment, any degradation in the performance of the hardware interaction is unacceptable.

SUMMARY OF THE INVENTION

This invention includes a method for operating a device used in a computer system by an application having exclusive use of the device. Requests from applications for the device are processed by an operating system. The applications may request use of a device in a general user mode or in an exclusive, low latency mode. The operating system passes requests for exclusive use of a device to a device driver which grants exclusive access to the requested device while blocking other requests for the device. An application's exclusive access to a device is not interrupted thereafter by the operating system.

The invention also includes a communications system for use between computer systems. A communication device such as an adapter card in the first computer system transfers data between the systems over a communication link such as a network. A device driver program executes in one of the computer systems, controlling access to the first device. The driver includes an interface to operating system software. One part of the device driver concurrently transfers data between the communication device and multiple, concurrently executing (multitasking) application programs of the system. Another part of the device driver transfers data exclusively between the device and one of the system's application programs, and prevents access to the device by other application programs.

Other features and advantages of this invention will become apparent from the following detailed description of the presently preferred embodiment of the invention, taken in conjunction with the accompanying drawings.

BRIEF DESCRIPTION OF THE DRAWINGS

FIG. 2 is a flowchart of the steps in processing a command in the "general user" mode of the preferred embodiment.

FIG. 3 is a flowchart of the steps in processing a command in the "low latency" mode of the preferred embodiment.

FIG. 6 is pseudocode of the device driver "v7open" function of FIG. 4.

DESCRIPTION OF THE PREFERRED EMBODIMENT

Overview

Figure 1:
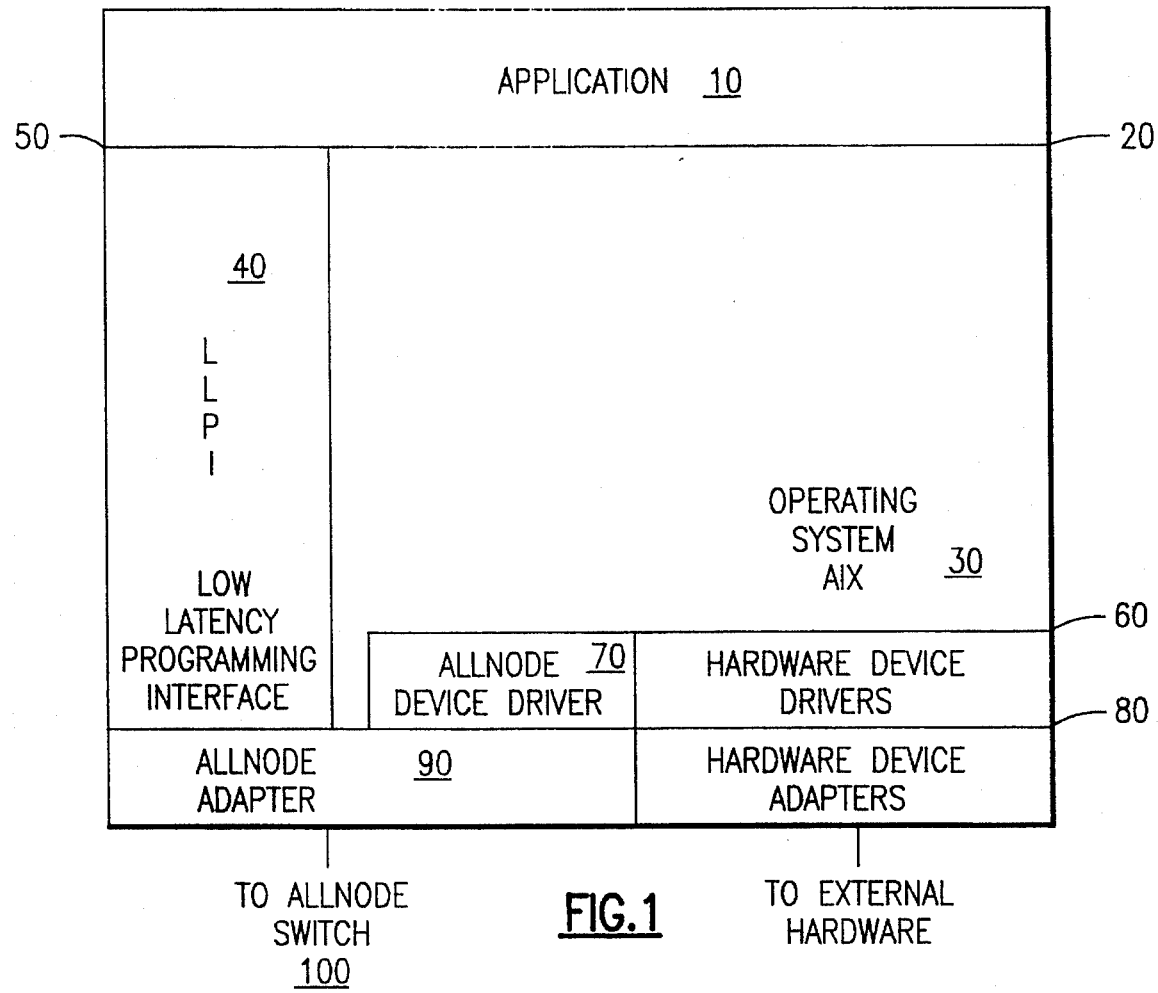
FIG. 1 shows the layers of a data processing system incorporating the preferred embodiment of this invention.

The preferred embodiment of this invention improves the performance of an application program of one computer system communicating with application programs on other systems over a data communications device known as the Allnode Switch (switch). The switch provides a very high speed communications path to send data between applications on independent systems. To perform efficiently the application must be able to read data from and write data to the switch as quickly as possible.

The "low latency" mode of this invention permits an application to obtain exclusive, direct access to a hardware device. This allows the application to interact directly with the hardware device when required and in the minimum time possible. The purpose of this invention is to allow an application to obtain the minimum possible interaction time with a hardware device in a data processing environment. When minimum interaction time is not required, then the invention allows applications to share the hardware device with degraded interaction time for a single application in a "general user" mode.

Two elements are required for this invention. The first is a device driver (sometimes known as a kernel extension) that operates in a dual mode. This device driver is a part of the system and is the interface between the operating system and the hardware device.

The first mode of operation for the device driver is the "general user" mode. This mode allows multiple applications to share the hardware device. In this mode commands from the application to interact with the hardware device are passed to the operating system. The operating system then passes these commands to the device driver. The device driver interacts with the hardware device based on the command. If data is to be passed to the hardware device the device driver obtains the data from the application data area. The device driver then moves the data directly into the hardware device or into a system send buffer until the hardware device is ready to accept it. If data is to be received from the hardware device, the device driver moves the data from the hardware device or a system receive buffer into the application data area. The data will be in a system receive buffer if the device driver has read the data from the hardware device prior to the application command requesting the data.

The second mode of operation for the device driver is the "low latency" mode. In this mode the application is given exclusive, direct access to the hardware device. All other applications are then blocked from using the hardware device. In this mode the application interacts directly with the hardware device without the overhead of the operating system and device driver layers. Data is moved directly between the application data area and the hardware device. Once the application receives exclusive, direct access to the hardware device, it does not have to interact with the system until it releases access to the hardware device.

To simplify the application access to the hardware device the second element of this invention is available. This is the Low Latency Programming Interface (LLPI) code. The LLPI code is an extension to the device driver that can process the same commands as the device driver. The LLPI code resides with the application code and is called directly by the application code. From the system point of view it is a part of the application and does not require additional processing overhead.

Computer System - FIG. 1

FIG. 1 shows the computer system implementation of this invention. The system consists of the operating system AIX 30 and the device driver 70. AIX 30 controls application access to the device driver 70 using the AIX device driver interface 60. The device driver 70 in turn controls access to the hardware device (preferably the adapter) via the IBM MicroChannel 80. The adapter 90 sends to and receives data from other systems through the switch 100.

The application 10 has two interfaces: the AIX File System interface 20 to AIX 30 and the low latency interface 50 to the Low Latency Programming Interface (LLPI) 40. The application 10 uses the AIX File System interface 20 for the general user mode access to the device driver 70. In this mode all interactions proceed from the application 10, across the AIX File System Interface 20, through the AIX operating system 30, across the AIX device driver interface 60, through the device driver 70, across the IBM Microchannel 80 and to the adapter 90. This is a high overhead path that can be used by multiple applications at the same time. The AIX operating system 30 and the device driver 70 prevent conflicts at the adapter 90 level by buffering data and suspending application 10 processing when necessary.

The application 10 low latency interface 50 to the low latency programming interface 40 is used during the second, low latency, mode of operation. Because the AIX operating system 30 considers the low latency programming interface code 40 to be part of the application 10, calls across the low latency interface 50 require significantly less processing time than calls across the AIX File System interface 20. The initial command from the application 10 to the LLPI 40 is made to obtain exclusive, direct access to the adapter 90. This command is sent by the application 10 across the low latency interface 50 to the LLPI 40. The LLPI 40 generates an AIX File System open command requesting access via the low latency mode. The open command is then passed across the AIX File System interface 20 to the AIX operating system 30 which processes the command. The AIX operating system 30 determines that the command is for the device driver 70 so it passes the command to the device driver 70 across the AIX device driver interface 60. The device driver 70 then determines if the application 10 can have exclusive, direct access to the adapter 90. If access is granted, the device driver 70 maps the adapter 90 addresses into the application 10 address space. The device driver also rejects all future calls to access the adapter 90 in low latency or general user mode. This insures that the application 10 has exclusive access to the adapter.

Once exclusive, direct access has been granted to the application 10, all commands to the adapter 90 follow an extremely low overhead path. Commands are passed to the LLPI 40 across the low latency interface 50. The LLPI 40 then interacts directly with the adapter 90 across the IBM Microchannel 80.

The differences between the processing required for the two modes are best seen in FIGS. 2 and 3.

General User Mode - FIG. 2

FIG. 2 shows an expanded view of the general user command path. A command originates in the application 10. It is passed across the AIX File System interface 20 to the AIX operating system 30. Before the AIX operating system 30 can actually start processing the command an application to AIX context switch 21 must occur. This is a very expensive operation in which the processing status of the application 10 is saved and the processing status of the AIX operating system 30 is restored. The AIX operating system 30 then processes the command and passes it across the AIX device driver interface 60 to the device driver 70. The device driver 70 must then access the adapter address space 71. Then the device driver 70 can interact with the adapter 90 across the IBM Microchannel 80. When the interaction is complete the device driver 70 releases the address space 72 and completes processing. Control is then passed back to the AIX operating system 30 across the AIX device driver interface 60. The AIX operating system 30 then completes its processing and performs an AIX to application context switch 22 in which the AIX operating system 30 status is saved and the application status 10 is restored. Finally control is returned to the application 10 across the AIX File System interface 20.

Low Latency Mode - FIG. 3

FIG. 3 illustrates the simpler flow of a command in the low latency mode of operation. A command originates in the application 10. It is passed across the low latency interface 50 to the low latency programming interface 40. A context switch to save and restore status is not required as the low latency programming interface 40 is part of the application. The low latency programming interface 40 can now interact directly with the adapter 90 across the IBM Microchannel 80. Accessing the adapter address space 71 is not required because that is done just once when exclusive access is granted by the device driver 70. Releasing the adapter address space 72 is also not required because that will be done when exclusive access is released by the application 10. When the interaction is complete the low latency programming interface 40 completes processing and passes control back to the application 10 across the low latency interface 50.

There are two functions required for the implementation of this invention. The first function is the "v7open" function and is used by an application 10 to request access to the adapter 90 in general user or low latency mode. The second function is the "v7close" function which is used by an application 10 to release access to the adapter 90. Both of these functions are implemented in the device driver 70 and are accessed via the AIX File System interface 20. The v7close function is also invoked by the AIX operating system 30 via the AIX device driver interface 60 when an application 10 terminates execution before calling the v7close function.

Figure 4:
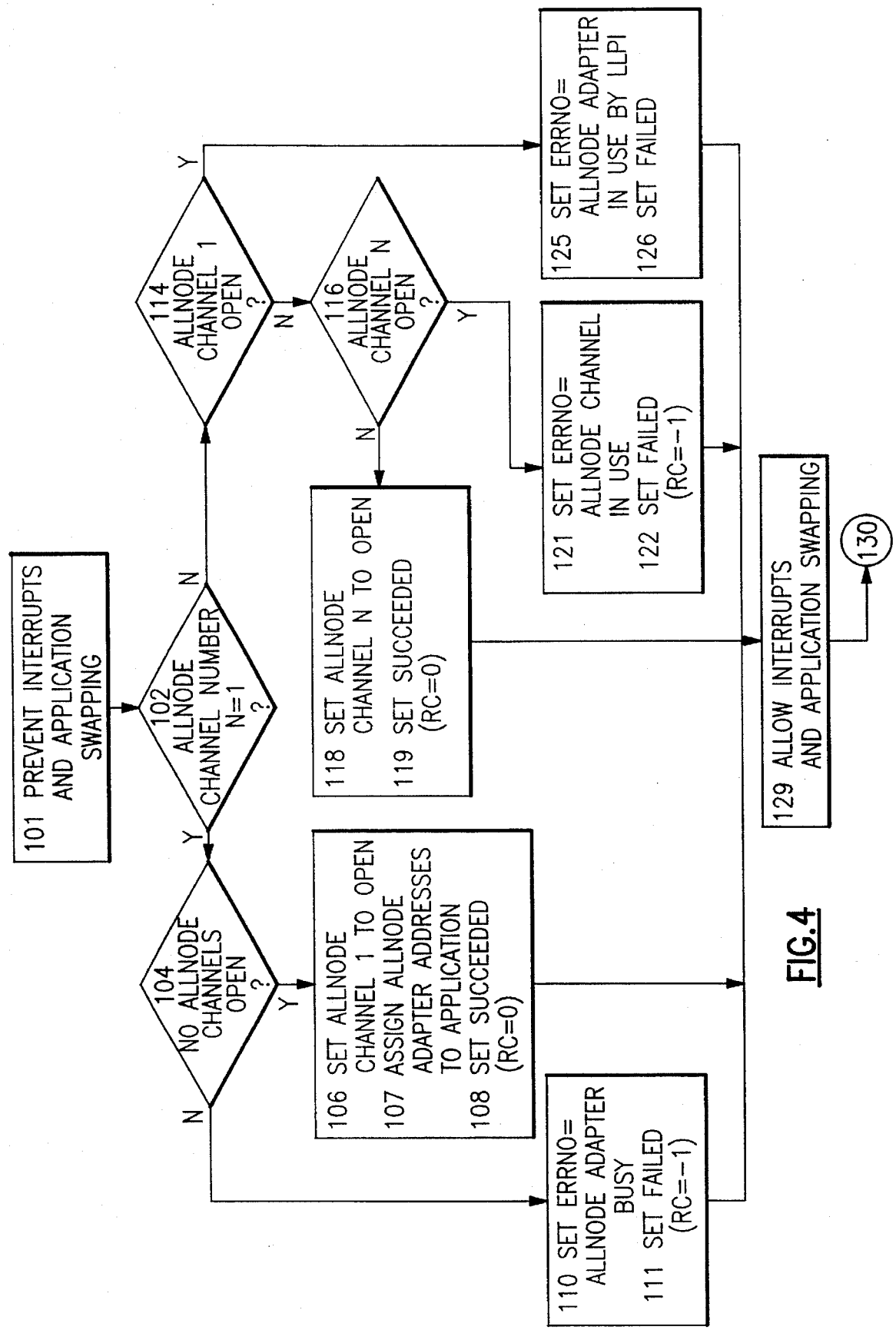
FIG. 4 is a flowchart of the device driver "v7open" function.

Device Driver v7open Function - FIGS. 4 and 6

The v7open function allows an application 10 to obtain access to the adapter 90 in one of two modes. The first mode is the general user mode. In this mode several applications may share access to the adapter 90 without conflict. The second mode is the low latency mode in which a single application 10 is granted exclusive, direct access to the adapter 90. In this mode one and only one application 10 may interact with the adapter 90.

The v7open function is implemented in the device driver 70. In is invoked by the AIX File System interface 20 open command. Table 1 shows a pseudo syntax, input and output for the AIX open command. The actual syntax for each system may be different but the input and output shown are required. The key input are the adapter pointer "v7" and the channel number "n ."

TABLE 1

AIX open Command Pseudo Syntax syntax:  fd = open("v7", n);
where:  "v7l"Allnode Adapter Pointer, required exactly as is.
      n      Allnode Channel Number:
           0 <= n <= 63.
      fd     AIX file descriptor:
           0 <= fd: successful open
           −1 = fd: open failed, reason is in errno.

In this implementation the AIX operating system 30 inspects the input data. Upon identifying the adapter pointer "v7" the AIX operating system 30 knows that this is an open command for the device driver 70. This is translated to a call to the v7open function in the device driver 70. The AIX operating system 30 passes control to the v7open function across the AIX device driver interface 60. A pseudo syntax for the call to the v7open function is shown in Table 2. The v7open function inspects the channel number n. Channel number n=1 indicates a request for the low latency mode of exclusive, direct access. All other channel numbers indicate general user mode access.

TABLE 2

Allnode v7open Function Pseudo Syntax syntax:  rc = v7open(n);
      n      Allnode Channel Number:
           0 <= n <= 63.
      rc     return code:
           0 = rc: successful close
           −1 = rc: close failed, reason is in errno.

The v7open function then performs the logic illustrated by the flowchart of FIG. 4 and the pseudocode of FIG. 6. At the completion of processing, the v7open function determines if access will be granted to the adapter 90 for this application 10. If access is granted the v7open function returns a successful (rc=0) return code to the AIX operating system 30 across the AIX device driver interface 60. The AIX operating system 30 then assigns an AIX File Descriptor to the requesting application 10 for the adapter 90 and channel number n. The AIX operating system 30 then returns control to the application 10 across the AIX File System interface 20.

If the v7open function does not grant access to the adapter 90 for this application 10, then the v7open function returns a failed (rc=−1) return code to the AIX operating system 30 across the AIX device driver interface 60. The v7open function also places a reason code in the AIX system variable errno. The AIX operating system 30 makes the errno variable available to the application 10 for inspection. The AIX operating system 30 then returns a failed AIX File Descriptor (fd=−1) to the application 10 across the AIX File System Interface. The application 10 can then directly access the AIX system variable errno to determine the reason for the failure.

FIGS. 4 and 6 contain flowchart and pseudocode of the v7open function. The first thing that must be done is to prevent the device driver 70 from being interrupted in the middle of processing. If this is not done, an interrupt or application swap can allow another application to request access to the same channel being requested by this application. If that happens between the cheek on line 104 and the set on line 107, both applications will end up with exclusive access to the adapter 90. On line 102 a cheek is made to determine which mode is being requested. If the channel n=1 then the low latency mode is being requested and execution continues on line 104. Otherwise execution continues on line 114.

Line 104 starts the processing of a low latency mode request. If no channels are open at that time, the request is granted and lines 106 through 108 are executed to set channel 1 to open status, assign the adapter 90 addresses to the application, and set a successful completion. If one or more channels are open, then exclusive access cannot be granted. Lines 110 and 111 are then executed to let the AIX operating system 30 and the application 10 know that the adapter is being used and exclusive access was not granted.

Line 114 starts the processing of a request for general user access to the adapter 90. The first cheek on line 114 is if exclusive access to the adapter 90 has already been granted to an application 10. If exclusive access has not been granted, then lines 116 through 122 are executed. Otherwise, lines 125 and 126 are executed to let the AIX operating system 30 and the application 10 know that the adapter is being used in low latency mode and general user mode cannot be granted.

Line 116 checks to see if the channel n requested for general user mode is available. If the channel n is not open, then lines 118 and 119 are executed to set channel n to open status and set a successful completion. Otherwise, lines 121 and 122 are executed to let the AIX operating system 30 and the application 10 know that the requested channel is in use and access is not allowed.

Line 129 releases the lock on normal interrupt and application swapping operations and line 130 completes execution of the v7open function by returning the completion return code to the AIX operating system 30 open command.

The v7open function is the key element in providing an application 10 with exclusive, direct access to the adapter 90. It does this by insuring that the low latency mode can be granted only if no other applications have been granted access to the adapter 90. This function also supports shared access to the adapter 90 in general user mode by allowing up to 63 channels to be opened at the same time if no applications are requesting the low latency mode. It is not a requirement of this application that the number of general user mode channels be 63. That is strictly an implementation decision. The v7open function resides in the device driver 70 code.

Figures 5, 7:
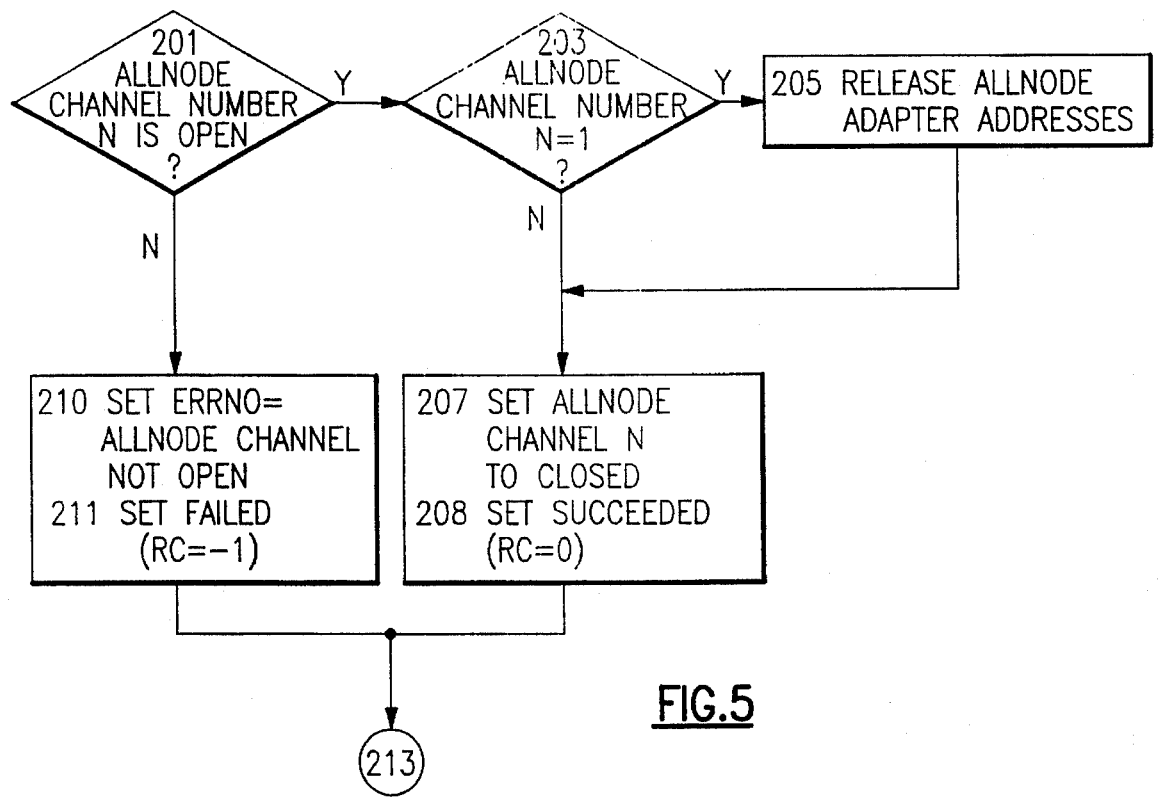
FIG. 5 is a flowchart of the device driver "v7close" function.
FIG. 7 is pseudocode of the device driver "v7close" function of FIG. 5.

Device Driver v7close Function - FIGS. 5 and 7

The v7close function allows an application 10 to release its access to the adapter 90. This function releases the application 10 access to the specific channel n indicated by the provided AIX File Descriptor. Once released, that channel is available for use by the same or a different application 10.

If an application 10 terminates without issuing a call to the v7close function, then the AIX operating system 30 will call the v7close function across the AIX device driver interface 60. The AIX operating system 30 will call the v7close function once for each open AIX File Descriptor assigned to the device driver 70 for the terminated application 10. This prevents opened channels from being inaccessible because an application terminated unexpectedly. This behavior is a feature of the system used in the implementation and is not required for this invention.

The v7close function is implemented in the device driver 70. In is invoked by the AIX File System interface 20 close command. Table 3 shows a pseudo syntax, input and output for the AIX close command. The actual syntax for each system may be different but the input and output shown are required. The key input is the AIX File Descriptor (fd) that was returned by a successful AIX open command (FIGS. 4 and 6).

TABLE 3

AIX close Command Pseudo Syntax syntax: rc = close(fd);
where: fd    AIX file descriptor returned by a successful open.
       rc    return code:
             0 = rc: successful close
             −1 = rc: close failed, reason is in errno.

In this implementation the AIX operating system 30 converts the AIX File Descriptor to a device and channel number. Upon identifying the device as the adapter 70, the channel number is passed to the device driver v7close function across the AIX device driver interface 60. A pseudo syntax for the call to the v7close function is shown in Table 4. The v7close function inspects the channel number n to determine the access mode being released. Channel number 1 indicates a release of the exclusive access to the adapter 90 in low latency mode. All other channel numbers indicate release of a general user mode channel. The v7close function performs the logic illustrated by the pseudo code in FIG. 5 and discussed in the following section. At the completion of processing, the v7close function returns a successful (rc=0) or unsuccessful (rc =−1) return code to the AIX operating system 30 across the AIX device driver interface 60. The AIX operating system 30 then returns control to the application 10 across the AIX File System interface 20.

TABLE 4

Allnode v7close Function Pseudo Syntax syntax: rc = v7close(n);
where: n     Allnode Channel Number:
             0 <= n <= 63.
       rc    return code:
             0 = rc: successful close
             −1 = rc: v7close failed, reason is in errno.

If the v7close function returns an unsuccessful return code, it also places a reason code in the AIX system variable errno. The AIX operating system 30 makes the errno variable available to the application 10 for inspection. The AIX operating system 30 then returns the failed return code (rc=−1) to the application 10 across the AIX File System Interface. The application 10 can then directly access the AIX system variable errno to determine the reason for the failure.

FIGS. 5 and 7 contain flowchart and pseudocode of the v7close function. On line 201 a check is made to see if the specified channel n is open. If the specified channel is open, then lines 203 through 208 are executed. Otherwise, lines 210 and 211 are executed to let the AIX operating system 30 and the application 10 know that the requested channel is already closed.

Line 203 starts the release processing of an opened channel. If the channel n=1 then the low latency mode is being released and execution continues on line 205 where the adapter 90 addresses are released from the application 10 address space. In either case, execution continues on lines 207 and 208 where the channel n is set to closed status and a successful completion code (rc=0) is set. In all cases line 213 is executed to complete the execution of the v7open function by returning the completion return code to the AIX operating system 30 close command.

The v7close function is the companion function to the v7open function. It allows an application 10 to release access to the adapter 90 for a specific channel. A key element in this function is that the release of channel n=1 will result in the application 10 losing access to the adapter 90 address space. This allows another application 10 to obtain low latency mode access to the adapter and prevents any conflict with the original application 10. The v7close function resides in the device driver 70 code.

A principal advantage of this invention first is that the application may obtain direct access to the entire hardware device, allowing the application to attain the minimum possible interaction time with the hardware device. The second advantage is that once granted exclusive access an application is sure of continued access and consistent interaction time—neither the system nor another application can pre-empt the application from using the hardware device.

It will be appreciated that, although specific embodiments of the invention have been described herein for purposes of illustration, various modifications may be made without departing from the spirit and scope of the invention. In particular, other obvious alternates to the preferred embodiment are changing the open/close command syntax shown in the tables 1–4, using different processor-to-hardware device interfaces, having the device driver queue requests for exclusive access to a device. Also, the operating system might not be required to call the close function if the application terminates unexpectedly, instead the device driver could monitor whether there are any open file descriptors. Furthermore, if hardware supports multiple applications accessing simultaneously, there could be a higher number of exclusive channels. Accordingly, the scope of protection of this invention is limited only by the following claims and their equivalents.

We claim:

1. A method for operating a device of a computer system, comprising the steps of:
    (a) an operating system of the computer system managing operation of any devices of the computer system;
    (b) processing by the operating system (kernel) requests from concurrent applications executing programs to access the device in a first (shared, or general user) mode, said operating system preventing conflicts between applications concurrently requesting access in the first mode to the device, said applications' access to the device controlled by the operating system;
    (c) processing by the operating system a request by one of the application programs for access to the device in a second (exclusive) mode, said processing of the request for access in the second mode including the steps of:
        (1) distinguishing said request for access to the device in the second mode, generated by said one of the application programs, from a request for access to the device in the first mode;
        (2) passing said request for access to the device in the second mode to a device driver;
        (3) blocking by the device driver requests from others of the application programs for access to the device in either the first mode or the second mode; and
        (4) entirely bypassing the operating system and accessing the device directly by the application program that issued the request for access in the second mode, without interruption for both input and output access, after step (2), by any operating system processes or interfaces between the device and the application program, until the application program completes its direct accessing.

2. The method of claim 1, wherein step (c) further includes the step of the application program invoking a direct (low latency) interface to the device.

3. The method of claim 2 wherein the interface to the device is linked into the application program.

4. The method of claim 1, wherein steps (b) and (c) include respective calls to the device driver.

5. The method of claim 1, wherein step (c) further includes mapping memory addresses of the device into an address space of the application program.

6. The method of claim 5, wherein the application program sends data to the device by moving said data into a portion of the application program's address space into which the addresses of the device are mapped.

7. The method of claim 5, wherein step (c) further includes the steps of:
    (i) moving data by the device driver from the device into a portion of the application program's address space into which the device's addresses are mapped, and
    (ii) reading said data by the application program from said portion of the application program's address space.

8. The method of claim 5, wherein step (c) further includes the steps of:
    (i) the device driver transferring the data from the device to a buffer,
    (ii) the application program requesting the data,
    (iii) the device driver moving the data from the buffer into a portion of the application program's address space into which are mapped the device's addresses, and
    (iv) the application program reading the data from said portion of the application program's address space.

* * * * *